May 9, 1944.    G. WELLS    2,348,507

BASTER ROASTER

Filed April 9, 1943

Inventor:
George Wells

Patented May 9, 1944

2,348,507

UNITED STATES PATENT OFFICE 2,348,507

BASTER ROASTER

George Wells, Komas Ranch, Denman Island, British Columbia, Canada

Application April 9, 1943, Serial No. 482,427
In Canada March 22, 1943

2 Claims. (Cl. 99—347)

My invention has for its object to produce a ventilated and self, or automatic baster-roaster which shall be so constructed as to permit steam to readily escape; wholly prevent the spattering of grease; and baste the contents of a utensil with fat or water, as desired, during the process of cooking without assistance by hand, and permits the contents to remain unattended for the regulated time required for cooking without periodic attention, thereby maintaining an uniform temperature throughout the operation.

With these ends in view I have devised a novel construction of which the following description in connection with the accompanying drawing is a specification, numbers being used to designate the several parts.

Figure 1:
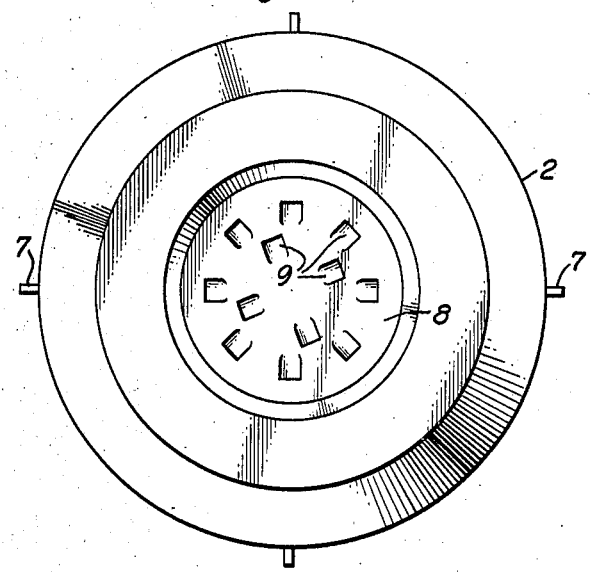
Figure 2:
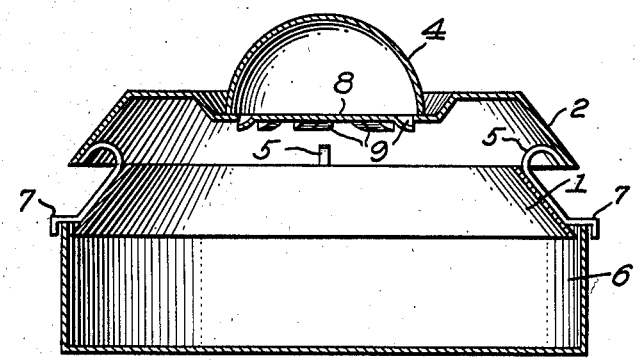
Figure 3:
Figure 4:
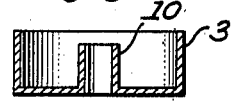
Figure 5:
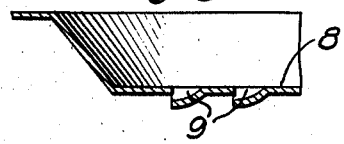

Fig. 1 is a plan view illustrating the top only of my novel baster-roaster, Fig. 2 is a section on the line, Fig. 3 is a section of the cowl, Fig. 4 is a section of the container, Fig. 5 is a detail section of the sunken centre holed in metal.

My novel baster-roaster consists of a number of one or more surrounds (the number of surrounds, and shape is of course not the essence of my invention) surmounted by cover and an open container and the said container is covered by a cowl. In the present instance I have shown my novel baster-roaster as consisting of four parts, to wit: a surround denoted by 1, a cover denoted by 2, a container with inverted overflow denoted by 3, and a cowl denoted by 4. The surround and cover are positioned on a louvre system and secured together to leave spaces 5, which permit steam to escape freely.

For convenience in illustration I have shown my novel baster-roaster as upon a roaster which is indicated by 6. The surround is suitably shaped to fit just below the rim of the roaster 6, and is fitted with lugs 7 to rest upon the rim of the roaster 6. The cover 2 has a sunken centre section 8 shown more specifically in detail drawing Fig. 5. The sunken centre section 8 is holed 9 in metal in the shape shown in Fig. 5 and is holed 9 in glass or pottery in the shape shown in Fig. 6. The container 3 is placed on the sunken centre section 8 and is filled with water and is covered by the cowl 4. When sufficiently hot, or boiling, the water seeps over the inverted overflow 10 on to the roaster's contents giving a steady process water baste. Should a fat or grease baste be required the container 3 is replaced by a cube of fat which is covered by the cowl and gives a steady baste by the grease extracted by the heat.

It will be seen from Fig. 2 that the construction is such that while it is impossible for grease to spatter outside the cover, or utensil through the spaces 5, such spaces give free egress to steam and equally free ingress to heat and thereby produces a non-steamed and well browned content, also that the container 3 of water or its substitution by a cube of fat gives an assured basting without any personal attention.

Having described my invention, what I claim as new and desire to secure by Letters Patent is:

1. A self basting roaster cover consisting of a surround, above and to which is attached by distance pieces a cover, leaving a space between the said surround and the said cover; the said cover is provided with a sunken centre section in the top; the said sunken centre section is provided with a number of holes, each hole commencing from the central or inward position to the outward position and is of a downward oblique pattern; the aforesaid surround has lugs or arms attached to the outside at a point which permits its lower rim to be positioned slightly lower than the rim of the roaster; the afore-mentioned sunken centre section is provided with a detached cowl which in conjunction with the sunken centre section and through the afore-mentioned holes in the sunken centre section provide a course for self basting by placing a portion of fat material beneath the said cowl.

2. A self basting roaster cover consisting of a surround, above and to which is attached by distance pieces a cover, leaving a space between the said surround and the said cover; the said cover is provided with a sunken centre section in the top; the said sunken centre section is provided with a number of holes, each hole commencing from the central or inward position to the outside position and is of a downward oblique pattern; the afore-said surround has lugs or arms attached to the outside at a point which permits its lower rim to be positioned slightly lower than the rim of the roaster; the afore-mentioned sunken centre section is provided with a detached cowl; the said cowl is provided with a detached cup container with an inverted overflow and is placed immediately underneath the cowl and may be filled with water or other liquid to provide an automatic or self baste.

GEORGE WELLS.